United States Patent Office 3,700,633
Patented Oct. 24, 1972

3,700,633
SELECTIVELY HYDROGENATED BLOCK
COPOLYMERS
Milton M. Wald, Walnut Creek, Calif., and Myron G. Quam, deceased; said Wald assignor to Shell Oil Company, Houston, Tex.
No Drawing. Continuation-in-part of application Ser. No. 806,763, Dec. 24, 1968, which is a continuation-in-part of abandoned application Ser. No. 333,671, Dec. 26, 1963. This application May 5, 1971, Ser. No. 140,612
(Filed under Rule 47(a) and 35 U.S.C. 116)
Int. Cl. C08f 19/06, 19/08
U.S. Cl. 260—880 B                 5 Claims

ABSTRACT OF THE DISCLOSURE

Block copolymers having low melt viscosity and improved processability comprise selectively hydrogenated block copolymers comprising A and B, non-elastomeric block A being substantially non-hydrogenated homopolymer blocks of mono alpha alkenyl arenes and elastomeric blocks B being random copolymer blocks of mono alpha alkenyl arenes and conjugated dienes wherein at least 90% of the aliphatic double bonds are hydrogenated.

---

This application is a continuation-in-part of our copending application Ser. No. 806,763, filed Dec. 24, 1968, now U.S. Pat. 3,595,942, which in turn is a continuation-in-part of application Ser. No. 333,671, filed Dec. 26, 1963, now abandoned.

As the copending application referred to above states, the hydrogenation of ordinary rubber such as polybutadiene is known and is carried out primarily for the purpose of improving stability toward ozone or oxygen. In many instances, the hydrogenation of such homopolymers or random copolymers with many catalysts known in the art of hydrogenation results in serious degradation of the polymers being so treated. However, as both of the patent applications referred to above disclose, it was found by applicants that certain catalytic systems could be devised which were especially useful for the hydrogenation of block copolymers and, more specifically, for the selective hydrogenation thereof. The important feature of these particular hydrogenation catalysts was the finding that their use resulted in minimum degradation of block copolymers during the hydrogenation procedure. This is a more important aspect when dealing with block copolymers then when homopolymers or random copolymers are concerned. The reason for this is that homopolymers or random copolymers attain their maximum tensile strength and other stress-strain properties through chemical crosslinks (vulcanization). Contrary to his, however, one of the primary features of block copolymers which set them apart from homopolymers or random copolymers is that their peculiar structure is one which results in a polymer characteristically referred to as "a thermoplastic elastomer" and is therefore "self-vulcanizing" through phyical crosslinks. By this is meant a polymer which, above the glass transition temperatures of its typical thermoplastic block, behaves like a thermoplastic material such a polyproylene, for example, but which below this glass transition temperature exhibits elastomeric properties characteristic of a vulcanized rubber without having actually been chemically vulcanized. However, if at any time during the processing, e.g., hydrogenation of such block copolymers, chain scission occurs, then the self-vulcanizing properties of the product are immediately lost and cannot be recovered. This is because scission occurs in the typical elastomeric block and this elastomers block can no longer be tied into the network by thermoplastic blocks on each end serving as physical crosslinks. Consequently, it is especially important to treat block copolymers under circumstances whereby degradation is held to a minium.

The copending application is directed to block copolymers wherein one type of block comprises polymer blocks of mono alpha alkenyl arenes such as styrene or alpha methyl styrene. A second type of block must be present in which is elastomeric and comprises blocks of conjugated dienes such as butadiene or isoprene. In accordance with the invention claimed in the copending application, the products are selectively hydrogenated so that no more than a minor amount of the arene double bonds are hydrogenated but more than about 90% of the aliphatic double bonds are reduced. The resulting products are shown in that application to have a number of beneficial properties not possessed by the non-hydrogenated precursors of the hydrogenated products.

Since the block copolymers being considered here are regarded as thermoplastics above their glass transition temperatures, one of the technical concerns is the melt viscosity of these products. This latter property is especially important when the block copolymers are being processed such as in extruding equipment. The throughput may be seriously limited by products having high melt viscosities. Actually, it has been determined that block copolymers characteristically have relatively high melt viscosities, particularly when the diene blocks are homopolymeric blocks. A typical case in point is a polymer which prior to hydrogenation has a structure polystyrene-polyisoprene-polystyrene. The melt viscosity of such polymers either before or after hydrogenation is substantially higher than processors might desire.

It is an object of the present invention to provide improved selectively hydrogenated block copolymers. It is a particular object of the invention to provide selectively hydrogenated block copolymers having relatively low melt viscosities. It is a further specific object of the invention to provide selectively hydrogenated block copolymers having improved processability. Other objects will become apparent during the following detailed description of the invention.

Now, in accordance with the present invention, improved block copolymers having relatively low melt viscosities and improved processability comprise selectively hydrogenated block copolymers having blocks A and B, blocks A being substantially non-hydrogenated homopolymeric blocks of mono alpha alkenyl arenes and blocks B being random compolymeric blocks of mono alpha alkenyl arenes and conjugated dienes wherein at least 90% of the aliphatic double bonds are reduced. Blocks A are essentially non-elastomeric, while blocks B even after selective hydrogenation thereof are regarded as elastomeric. The significant finding of this invention is that the copolymeric elastomeric blocks as described above when selectively hydrogenated to reduce at least 90% of the aliphatic unsaturation results in products having significantly reduced melt viscosities and improved processability. The two properties are believed to be interrelated. The same results are not obtained if the elastomeric block comprises copolymeric blocks of two or more dienes, such as isoprene and butadiene, the arene being absent from the block. Apparently, this is due to the fact that arenes are selectively not hydrogenated in the elastomeric block and thus retain their structural similarity to the thermoplastic block, leading to increase of block compatibility which reduces melt viscosity.

The subject block copolymers which are the precursors of the selectively hydrogenated products considered here may have two or more blocks A and B and may be either linear or branched in their molecular configuration. Typical structures especially contemplated include the following:

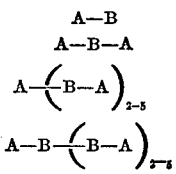

The blocks A, as referred to hereinbefore are non-elastomeric homopolymeric blocks of mono alpha alkenyl arenes, particularly styrene, alpha methyl styrene and ring alkylatd styrenes. The blocks B, on th other hand, comprise elastomeric copolymeric blocks of mono alpha alkenyl arenes and conjugated dienes. Preferably, the arene is present in such blocks in an amount between about 20 to 50% by weight thereof. The conjugated dienes preferably have been 4 to 8 carbon atoms, the most effective species being butadiene and isoprene.

The selectively hydrogenated block copolymers of the invention are those in which no more than about 25% of the arene double bonds in either blocks A or B have been hydrogenated and also in which at least 90% of the aliphatic double bonds have been reduced. The selectively hydrogenated block copolymers of the invention include those in which each block A has an average molecular weight between about 3,000 and 60,000 and each block B has an average molecular weight between 25,000 and 300,000 as determined by tritium counting methods.

It will be understood that throughout this specification and the claims the molecular weights referred to are with specific references to the molecular weight of either non-adjacent individual blocks or the total weight of adjacent essentially identical blocks. Thus, in the elementary linear block copolymer A—B—A, the molecular weights referred to above are clearly with reference to each individual block A and B. However, when branching in the polymeric molecular occurs as in the following types of exemplary structures.

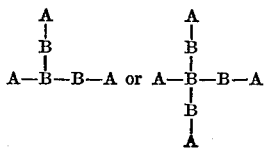

then the molecular weights are with reference to the total of all of the adjacent B blocks. While for many purposes the relatively low molecular weight limitations referred to above are suitable, for many other industrial applications the average molecular weight range of blocks A is between 8,000 and 60,000 while blocks B have an average molecular weight between about 50,000 and 300,000.

The basic structure contemplated has the general configuration A—B—A. In this case it will be understood that the single block B just represented actually may constitute two separate but adjacent blocks B and thus is represented by a single designation B. The block copolymers may be either linear or branched and may be prepared by known as well as new polymerization procedures. In the so-called sequential process, an initiator such as a lithium alkyl is utilized in polymerizing a first monomer such as styrene, after which a second conjugated diene monomer is injected such as polyisoprene and after its complete polymerization a second portion of a monovinyl arene such as styrene is injected to cause formation of the third polymer block. More preferred are the processes involving coupling procedures since closer control over molcular weight may be so achieved and the possibility also exist for altering the block copolymer configuration to suit particular purposes. In a typical coupling process, a lithium alkyl initiator is utilized for polymerizing styrene or other monovinyl arene after which a conjugated diene is injected to form a two-block copolymer bearing a terminal lithium ion. At this point a coupling agent such as a polyhalohydrocarbon or other polyfunctional coupling agent such as a diester or polyester may be injected to cause coupling of these intermediate block copolymers, thus forming the desired self-vulcanizing thermoplastic elastomer. The use of non-halogen coupling agents such as esters of polyvinylbenzene are preferred since halogen residues may adversely affect the hydrogenation catalyst during the later hydrogenation step. The block copolymers are preferably formed in an inert hydrocarbon solvent such as cyclohexane or mixtures thereof with alkanes or alkenes such as isopentenes but preferably saturated or inert to hydrogenation. The polymer cements so formed may then be directly utilized in the subsequent hydrogenation step.

The type of catalyst employed for the preparation of these selectively hydrogenated block copolymers does not form a part of the present invention although it is desirable to utilize the types of catalysts referred to in greater detail hereinafter. The requirement of any catalyst system utilized for this purpose, however, is two-fold, namely, that degradation of the polymers be held to a minimum and that the catalyst and the conditions of its use are selected so as to achieve the selective hydrogenation necessary for the production of the polymers of this invention.

It has been found that of all the types of catalysts potentially available for hydrogenation the most highly selective and non-destructive are the cobalt or nickel alkoxides and particularly cobalt or nickel acetyl acetonates reduced with an aluminum alkyl compound. Other suitable alkoxides include, for example, cobalt or nickel butoxides, ethoxides, amyloxides and isopropoxides. It is preferred that the alkoxide be an acetyl acetonate or mixtures thereof with one of the simple alkoxides of cobalt or nickel or mixtures thereof.

Preparation of the hydrogenation catalysts with unusually high activity is accomplished by reacting the metal alkoxide with an organo-aluminum compound of the formula:

$$R_{(3-n)}AlH_n$$

wherein R is a hydrocarbon group of from 1 to 10 carbon atoms, and $n$ is an integer from 0 to 3 (preferably from 0 to 2), inclusive, R may be an alkyl, aryl, alkaryl, aralkyl, or cycloaliphatic group. Examples of such groups include methyl, ethyl, n-propyl, i-propyl, n-butyl, i-butyl, sec.-butyl, tert.-butyl, pentyl, hexyl, heptyl, octyl, nonyl, decyl, phenyl, benzyl, cumyl, tolyl, cyclopentyl, cyclohexyl, cyclohexenyl, and naphthyl radicals. When R is an alkyl group, lower alkyl radical (1 to 4 carbon atoms) are preferred (methyl, ethyl, propyl, and butyl). Although $n$ may be an integer from 0 to 2, inclusive, trihydrocarbyl aluminum compounds such as tri (lower alkyl) aluminum are preferred reducing compounds; in this preferred case $n$ is zero.

The ratio of aluminum alkyl compound to nickel or cobalt alkoxide may vary widely since even a partial reduction results in the production of an active hydrogenation catalyst. Molar ratios of aluminum compound of cobalt or nickel alkoxide of between 0.1:1 to 10:1 may be employed but it is preferred to utilize ratios of between about 0.5:1 to 6:1.

In addition to the use of the alkoxides referred to above, the corresponding nickel or cobalt carboxylates may be employed, particularly, the nickel or cobalt fatty acid salts having from 1 to 18 carbon atoms in the hydrocarbon radical of the monocarboxylic acid. Suitable acids from which the nickel or cobalt salts may be formed include acetic, propionic, butyric, hexoic, octoate, dodecanoic and octodecanoic acids. These are utilized in connection with the aluminum alkyl components also referred to above in essentially the same ratios as detailed in that connection.

The selective hydrogenation is effectively controlled by utilizing relatively low hydrogenation temperatures in the order of 25–175° C., preferably 35–150° C. Reaction times will vary but normally are between 5 minutes and 8 hours, preferably ½ to 4 hours. The concentration of the polymer being hydrogenated in the relatively inert solvent is not an essential aspect of the present invention, it being realized by experts that the concentration will depend largely upon the other physical aspects of the process and will be chosen such that the hydrogenation product obtained eventually will be fluid enough that polymer recovery may be readily effective. Hydrogenation is normally conducted in an autoclave at hydrogen pressures below about 3,000 pounds and usually in the order of 100–1,500 pounds per square inch.

In particular accordance with the present invention, it has been found that this special type of block copolymer wherein the conjugated diene portion of the original block polymer is substantially completely hydrogenated while the thermoplastic polymer blocks of monovinyl arenes are virtually untouched in the hydrogenation process results in a number of physical advantages indicating great commercial potential for the substances. It has been found, for example, that they have high viscosities and may even perform as pseudo-solids at temperatures in excess of 200° C. while either the fully hydrogenated or non-hydrogenated counterparts of the same polymer fluids at temperatures in the order of 175° C. Moreover, due to the saturation of the aliphatic double bonds by hydrogenation, the polymers have especially high resistance to oxidation and because of this it is possible to utilize processing conditions which would not have been possible with the non-hydrogenated starting material. This is especially important since the polymers have been found to have relatively poor processability at the same temperatures at which the more unstabled non-hydrogenated block copolymers could be processed. Consequently, it is possible to increase the processing temperatures and to combine the selectively hydrogenated products with modified materials such as polystyrene, extending oils, pigments, carbon blacks and other reinforcing fillers, and resins to acheive compositions especially useful for many industrial purposes.

It is preferred when preparing block copolymers comprising butadiene as the diene component of the copolymer block that conditions be utilized for producing 20–70% 1,2-content in the condensed diene structures. These, upon subsequent hydrogenation, result in products having optimum elastomeric properties.

The following examples illustrate the preparation and properties of the block copolymers of this invention and compare their properties with similar block polymers which do not contain elastomeric copolymer blocks.

EXAMPLE I

Block copolymers of the invention having a random copolymer styrene/hydrogenated diene elastomeric block Purified styrene (30 grams; 33 cc.) was polymerized in 400 cc's. cyclohexane using secondary butyl lithium as the initiator (16.7 cc's. of 0.1–N solution). After about two hours at about 50° C., the solution of polystyllithium (about 2 mmoles) was mixed with a cyclohexane solution (about 100 cc's.) containing styrene (17.5 grams) and butadiene (3.3 grams). The temperature was raised to about 75° C. and butadiene (49.2 grams) as a 66⅔% solution of butadiene and hexane was continuously programmed in to maintain approximately the same initial monomer ratio in the reactor. After nearly complete conversion of the monomers at about five hours, the living polymer having the structure polystyrene-poly(styrene/butadiene)–Li which remained (1.5 mmoles) after sampling was coupled by adding phenyl benzoate (1.5 meq.) and reacting for 15 minutes at 75° C.

The solution of terminated coupled product was transferred to a hydrogenation reactor and hydrogenated for about 4 hours at 40° C. with 1200 p.s.i.g. hydrogen. The hydrogenation was carried out with nickel octoate-aluminum triethyl catalyst 1:3 nickel: aluminum, 1500 grams polymer to 1 gram of nickel. The precursor polymer was shown by NMR analysis to contain about 25 wt. percent styrene in the center block. The NMR analysis of the hydrogenated polymer showed the retention of all of the styrene and elimination of 95–100% of the aliphatic double bonds. The finished polymers which was a linear dimer of the living polymer referred to above, hydrogenated primarily with respect to aliphatic unsaturation, was treated in the form of its cement, to remove nickel, washed and coagulated in methanol. The final coupled polymer was shown by gel permeation chromatography to have segmental number average molecular weights in close agreement with the calculated values of 15,000–70,000–15,000.

EXAMPLE II

Block copolymers having a homopolymeric hydrogenated polybutadiene elastomeric block 468 g. purified styrene was mixed with 3750 g. cyclohexane and brought to 50° C. This mixture was titrated (scavenged) with 4 cc. 0.088 N sec. butyllithium. 275 g. 0.088 N (0.031 mole) sec.-butyllithium was then added and polymerization continued for about 1 hour 10 min. to utilize all the styrene. The polystyryllithium was then added to a solution of purified butadiene. 2160 g., in 11482 g. cyclohexane containing 50 g. tetrahydrofuran which had been scavenged in the same way as above at 35° C. Polymerization was continued for 3 hours at 40–45° C. At the end of this time a scavenged solution of 442 g. styrene+2650 cc. of cyclohexane was added to the reaction mixture and polymerization continued. This yielded a polymer having the structure polystyrene-polybutadiene-polystyrene with block sizes of 13,000–64,000–15,000 by tritium count. The 1,2 butadiene configuration in the center block was 40 to 46% by infrared analysis.

The polymer solution was charged to a hydrogenation reactor and diluted with 3.5 kg. purified cyclohexane and 6 cc. 15% isopropylalcohol in cyclohexane. The cement was then purged 2 times with $H_2$ to 100 p.s.i.g.

To the purged cement 1500 g. of catalyst solution was added containing 6 mm. Ni acetylacetonate (0.24 mm./l.) and 12 mm. (0.48 mm./l.) triethylaluminum.

The reactor was pressured to 500 p.s.i.g. with hydrogen and hydrogenation continued for 4 hours at 50° C. At this time an additional 750 g. of the same catalyst solution was added and hydrogenation continued for one more hour. After standing over night it was determined that the aliphatic unsaturation had been hydrogenated to over 98% conversion by NMR and IR analyses. This procedure yield a polymer consisting of (poly)styrene-ethylene/butylene-polystyrene blocks.

The gross product was treated with 1 liter of a solution containing 20%v reagent grade HCl (37%) and 8%v methanol to solubilize the catalyst residues. It was then water washed to remove the nickel and aluminum residues. The polymer was recovered by coagulating in a super heated $H_2O$ jet and air drying.

EXAMPLE III

Block copolymer of the invention having a random copolymeric hydrogenated styrene/isoprene elastomeric block The same general procedure used in Example I was repeated, except that isoprene was substituted for butadiene and the product was coupled with ethyl acetate instead of phenyl benzoate to produce a block polymer having the polystyrene - poly(styrene/isoprene) - polystyrene.

The hydrogenation conditions and procedure were as follows: 0.76 mm. Ni acetyl acetonate/l., 2.25 mm. aluminum-triethyl/l., 4.1 mm. isopropylalcohol (IPA)/l., temperature 40° C., pressure 750 p.s.i.g. $H_2$.

The nickelacetylacetonate was added to 400 cc. cyclohexane in the purged reactor. The aluminum triethyl was next added in 200 ml. cyclohexane. This mixture was stirred in 15 min. at 250° C. 1900 ml. of cement containing the IPA was added and the reactor purged with hydrogen and then pressured to 750 p.s.i.g. $H_2$. Hydrogenation required 4 hours. Sample treated with 5% vol. 20% HCl; methanol, $H_2O$ washed and neutralized with $NaHCO_3$. The polymer was recovered by coagulation in boiling $H_2O$.

EXAMPLE IV

Block copolymers having a homopolymeric hydrogenated polyisoprene elastomeric block 870 g. purified styrene added to 4565 g. purified cyclohexane. Mixture heated to 50° C. and scavenged with s-BuLi (sec.-butyllithium), 385 g. s-BuLi initiator (0.062 mole) added. Polymerized 1 hour 25 minutes at 50° C. to produce polystyryllithium. Polystyryllithium was then added to 2180 g. flashed isoprene in 11740 g. cyclohexane which had been scavenged with s-BuLi at 50° C. The polymerization was continued until isoprene was exhausted.

The solution was heated to 60° C. and 0.062 equivalents of ethyl acetate (as a coupling agent) were added. The reagents were heated to 80° C. for 1 hour.

This yielded a coupled block copolymer 90% of which had the structure polystyrene-polyisoprene-polystyrene with block molecular weights of 14,000–70,000–14,000.

The bulk of the polymer was transferred to the hydrogenation reactor which had been purged and charged with: 3.5 kg. cyclohexane, 280 ml. 25% wt. $Et_3Al$ solution, 30 g. anhydrous nickel acetate and 325 g. dry Celite 560 which had been heated under hydrogen at 230° C. for ½ hr. and cooled.

The polymer and catalyst were heated to 150° C. under 800–900 p.s.i.g. $H_2$ pressure for about 3 hrs. and then to 170° C. for ½ hr.

After venting the hydrogen and purging the cement with $N_2$ the hydrogenation cement was discharged to a Binks tank containing 400 ml. MeOH in cyclohexane. The cement was then filtered through a sparkler filter coated with Celite 560 to remove the catalyst. The clarified cement was coagulated in superheated water to recover the polymer. The polymer was oven dried.

Melt viscosities and glass transition temperatures of the products for Examples III and IV are given below:

| Example | III | IV |
|---|---|---|
| Melt viscosity (10 sec.$^{-1}$) poises at 175° C. | $2.3 \times 10^5$ | $4.8 \times 10^5$ |
| Melt viscosity (100 sec.$^{-1}$) poises at 175° C. | $4.2 \times 10^4$ | $7.1 \times 10^4$ |
| Glass transition temp., ° C. (torsion pendulum) | −23 | −50 |

The above data indicate that the block copolymer having the random elastomeric block had a lower melt viscosity then the product having the comparable homopolymeric elastomeric block, indicating better processability of the former. The same relationship holds when branched block copolymers are compared.

What is claimed:

1. A hydrogenated block copolymer having the general configuration

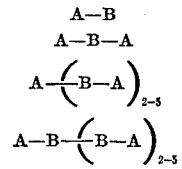

wherein prior to hydrogenation each A block is a mono alpha alkenyl arene homopolymer block and each B block is a random copolymer block of at least one conjugated diene and at least one mono alkenyl arene and, subsequent to hydrogenation, 0–25% of arene double bonds have been reduced, and at least 90% of the aliphatic double bonds have been reduced, each block A having an average molecular weight between about 3,000 and 60,000 and each block B having an average molecular weight between 25,000 and 300,000.

2. A hydrogenated block copolymer according to claim 1 wherein, prior to hydrogenation, each block B comprises 20–50% by weight of mono alpha alkenyl arene.

3. A hydrogenated block copolymer according to claim 1 wherein the average molecular weight of each block A is between about 8,000 and 60,000 and the average molecular weight of each block B is between about 50,000 and 300,000.

4. A hydrogenated block copolymer according to claim 2 wherein, prior to hydrogenation, each block B is a random copolymer of styrene and butadiene.

5. A hydrogenated block copolymer according to claim 2 wherein, prior to hydrogenation, each block B is a random copolymer of styrene and isoprene.

References Cited

UNITED STATES PATENTS 3,595,942   7/1971   Wald et al. _____ 260—880 B

JAMES A. SEIDLECK, Primary Examiner

W. F. HAMROCK, Assistant Examiner

U.S. Cl. X.R.

260—94.7 H, 96 HY, 879